(12) United States Patent
Rijkenberg et al.

(10) Patent No.: US 10,870,901 B2
(45) Date of Patent: Dec. 22, 2020

(54) HOT-ROLLED HIGH-STRENGTH ROLL-FORMABLE STEEL SHEET WITH EXCELLENT STRETCH-FLANGE FORMABILITY AND A METHOD OF PRODUCING SAID STEEL

(71) Applicant: TATA STEEL IJMUIDEN B.V., Velsen-Noord (NL)

(72) Inventors: Rolf Arjan Rijkenberg, Santpoort-Noord (NL); Maxim Peter Aarnts, Castricum (NL)

(73) Assignee: TATA STEEL IJMUIDEN B.V., Velsen-Noord (NL)

( * ) Notice: Subject to any disclaimer, the term of this patent is extended or adjusted under 35 U.S.C. 154(b) by 331 days.

(21) Appl. No.: 15/761,322

(22) PCT Filed: Sep. 21, 2016

(86) PCT No.: PCT/EP2016/072346
§ 371 (c)(1),
(2) Date: Mar. 19, 2018

(87) PCT Pub. No.: WO2017/050790
PCT Pub. Date: Mar. 30, 2017

(65) Prior Publication Data
US 2018/0265939 A1 Sep. 20, 2018

(30) Foreign Application Priority Data
Sep. 22, 2015 (EP) ..................................... 15186309

(51) Int. Cl.
*C21D 8/02* (2006.01)
*C21D 9/46* (2006.01)
(Continued)

(52) U.S. Cl.
CPC .......... *C21D 8/0263* (2013.01); *B32B 15/013* (2013.01); *C21D 9/46* (2013.01);
(Continued)

(58) Field of Classification Search
CPC ........ C21D 8/0263; C21D 9/46; C22C 38/00; C22C 38/02
See application file for complete search history.

(56) References Cited

U.S. PATENT DOCUMENTS

| | | |
|---|---|---|
| 2015/0099139 A1 | 4/2015 | Rijkenberg et al. |
| 2016/0007612 A1 | 1/2016 | Fabry et al. |

FOREIGN PATENT DOCUMENTS

| | | |
|---|---|---|
| EP | 1918396 A1 | 5/2008 |
| JP | H11140542 A | 5/1999 |

(Continued)

OTHER PUBLICATIONS

JP2009007640 English translation (Year: 2020).*
(Continued)

*Primary Examiner* — Christopher S Kessler
*Assistant Examiner* — Jiangtian Xu
(74) *Attorney, Agent, or Firm* — Vorys, Sater, Seymour and Pease LLP

(57) ABSTRACT

A hot-rolled high-strength steel strip or sheet with excellent roll-forming characteristics and excellent stretch-flange formability suitable for automotive chassis part or the like and, more particularly, to a high-strength steel strip or sheet with tensile strength of 780 MPa or higher, or preferably 950 MPa or higher, with an excellent combination of total elongation, stretch-flange formability and fatigue resistance and to a method of manufacturing the steel strip or sheet, and to the use of the strip or sheet in a part.

20 Claims, 2 Drawing Sheets

Figure 1A:
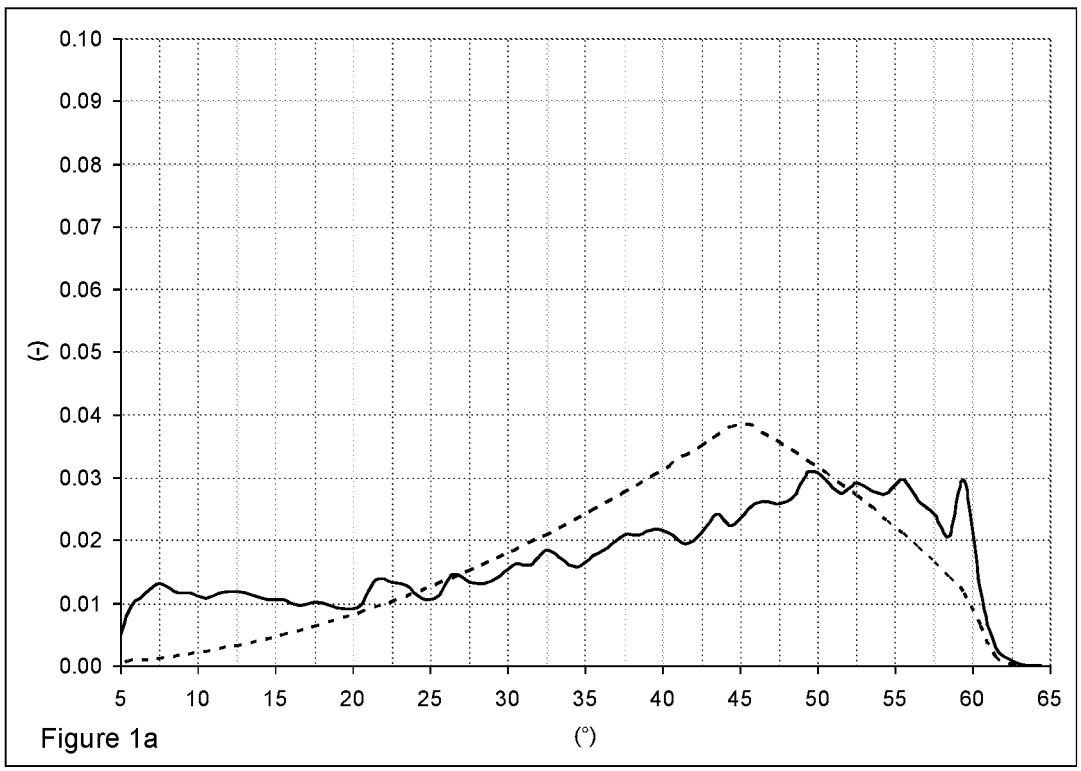

(51) Int. Cl.
*C22C 38/00* (2006.01)
*C22C 38/02* (2006.01)
*C22C 38/06* (2006.01)
*C22C 38/22* (2006.01)
*C22C 38/24* (2006.01)
*C22C 38/26* (2006.01)
*C22C 38/28* (2006.01)
*C22C 38/04* (2006.01)
*B32B 15/01* (2006.01)
*C22C 38/14* (2006.01)
*C22C 38/12* (2006.01)
*C22C 38/32* (2006.01)
*C22C 38/38* (2006.01)

(52) U.S. Cl.
CPC ............ *C22C 38/00* (2013.01); *C22C 38/001* (2013.01); *C22C 38/02* (2013.01); *C22C 38/04* (2013.01); *C22C 38/06* (2013.01); *C22C 38/12* (2013.01); *C22C 38/14* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C21D 8/0226* (2013.01); *C21D 2211/002* (2013.01); *C21D 2211/004* (2013.01); *C21D 2211/005* (2013.01)

(56) References Cited

FOREIGN PATENT DOCUMENTS

| | | | |
|---|---|---|---|
| JP | 2004197114 A | | 7/2004 |
| JP | 2004225109 A | | 8/2004 |
| JP | 2005146301 A | | 6/2005 |
| JP | 2006057120 A | | 3/2006 |
| JP | 2009007640 A | * | 1/2009 |
| JP | 2009007640 A | | 1/2009 |
| JP | 2014005890 A | | 1/2014 |
| JP | 2015520802 A | | 7/2015 |
| KR | 20150073024 A | | 6/2015 |
| WO | 2013167572 A1 | | 11/2013 |
| WO | WO-2013167572 A1 | * | 11/2013 ............ C22C 38/14 |

OTHER PUBLICATIONS

International Search Report and Written Opinion dated Dec. 21, 2016 for PCT/EP2016/072346 to Tata Steel Ijjmuiden B.V. filed Sep. 21, 2016.

\* cited by examiner

HOT-ROLLED HIGH-STRENGTH ROLL-FORMABLE STEEL SHEET WITH EXCELLENT STRETCH-FLANGE FORMABILITY AND A METHOD OF PRODUCING SAID STEEL

CROSS-REFERENCE TO RELATED APPLICATIONS

This is a § 371 National Stage Application of International Application No. PCT/EP2016/072346 filed on Sep. 21, 2016, claiming the priority of European Patent Application No. 15186309.9 filed on Sep. 22, 2015.

This invention relates to a hot-rolled high-strength steel strip or sheet with excellent roll-forming characteristics and excellent stretch-flange formability suitable for automotive chassis part or the like and, more particularly, to a high-strength steel strip or sheet with tensile strength of 780 MPa or higher, or preferably 950 MPa or higher, with an excellent combination of total elongation, stretch-flange formability and fatigue resistance and to a method of manufacturing said steel strip or sheet, and to the use of said strip or sheet in a part.

The continuous pressure on the automotive industry to reduce vehicle weight drives the development of advanced materials technology that enables cost-effective light-weight solutions. Advanced High-Strength Steels (AHSS) have opened up opportunities to employ their increased strength to downgauge and hence to save vehicle weight without compromising safety.

However, AHSS grades can impose challenges with regard to manufacturing robustness and/or in-service performance. In particular AHSS grades such as Dual-Phase (DP) or Transformation-Induced Plasticity (TRIP) steels with their microstructures consisting of soft, ductile ferrite with embedded hard low-temperature transformation phase constituents and/or retained-austenite islands may have issues with respect to stretch-flange formability or edge ductility during manufacturing operations. Additionally, the large differences in the hardness between the various phase constituents in AHSS may also deteriorate in-service durability when it comes down to fatigue resistance during cyclic loading.

To overcome these limitations, Ferrite-Bainite (FB) and Complex Phase (CP) steels were developed. These offer improved stretch-flange formability and improved fatigue resistance over DP and TRIP steels whilst still offering continuous work hardening behaviour and good uniform and tensile elongation. However, the strengthening mechanism of including more martensite islands in the final CP microstructure comes at the expense of stretch-flange formability and may lead to too low stretch-flange formability for manufacturing of automotive chassis components based on a complex and intricate light-weight design. CP steels also generally exhibit higher yield strength prior to forming than DP and TRIP steels.

Nano-precipitation strengthened single-phase ferritic high-strength steels are known for their superior combination of cold-stretchability and stretch-flange formability, and offer high fatigue resistance. Responsible for their excellent performance is a ductile single-phase ferritic microstructure, which is free of hard phase constituents like (coarse) cementite, pearlite, bainite, and/or martensite. This homogeneous microstructure prevents the early onset of stress localisation and its high resulting damage tolerance leads to both high tensile elongation and high hole-expansion capacity. The latter is regarded as a good measure for the stretch-flange formability. Unfortunately, these steels exhibit a high yield strength and high yield ratio, and in as-rolled condition they display discontinuous yielding behaviour and a pronounced yield point elongation which leads to localised bands of plastic deformation. These bands can have a negative impact on surface appearance or can impair fatigue resistance for instance when the material is bended and/or stretched, or roll formed to manufacture chassis components.

An object of the invention is to provide a high-strength steel having excellent roll-forming characteristics and excellent stretch-flange formability suitable for automotive chassis part or the like, combined with good total elongation, stretch-flange formability and fatigue resistance Another object of the invention is to provide a high-strength steel having excellent roll-forming characteristics and excellent stretch-flange formability suitable for automotive chassis part or the like, combined with good total elongation, stretch-flange formability and fatigue resistance with a continuous yielding behaviour in as-rolled condition.

Another object of the invention is to provide a high-strength steel having excellent roll-forming characteristics and excellent stretch-flange formability suitable for automotive chassis part or the like, combined with good total elongation, stretch-flange formability and fatigue resistance with a high yield strength and a high yield ratio.

Another object of the invention is to provide a high-strength steel having a tensile strength of 780 MPa or higher.

Another object of the invention is to provide a high-strength steel having a tensile strength of 950 MPa or higher.

Another object of the invention is to provide a method of manufacturing said steel strip or sheet.

According to a first aspect, one or more of these objects can be reached by a high-strength hot-rolled steel strip or sheet with a tensile strength of 780 MPa or higher with continuous yielding behaviour and an excellent combination of total elongation, stretch-flange formability, and fatigue resistance, comprising (in wt %):
  between 0.05 and 0.14% C;
  between 1.0 and 2.0% Mn;
  between 0.05 and 0.7% Mo;
  between 0.10 and 0.40% V;
  optionally one or more of
    at least 0.1 and/or at most 1.2% Cr;
    at least 0.01 and/or at most 0.14% Ti;
    at least 0.01 and/or at most 0.10% Nb;
  at most 0.5% Si;
  at most 0.04% P;
  at most 0.008% S;
  at most 0.1% Al_sol;
  at most 0.020% N;
  at most 0.003% B;
  optionally Ca in an amount consistent with a calcium treatment for inclusion control;
  balance Fe and inevitable impurities;
wherein the steel strip or sheet has a microstructure that contains a matrix consisting of a mixture of polygonal ferrite (PF) and bainitic ferrite (BF) and at most 5% of $\Sigma$ (martensite and retained-austenite), wherein the PF and BF is precipitation-strengthened with fine composite carbides and/or carbo-nitrides of V and/or of Mo and optionally of Ti and/or of Nb, wherein the overall microstructure contains at least 0.8% of $\Sigma$(M+RA) and wherein the matrix contains (in volume percent of the matrix) at least 40% BF and at most 60% PF.

The steel according to the invention has a microstructure with sufficient martensite (M) to improve work hardening and to suppress discontinuous yielding and yield point elongation on the one hand, but the amount of hard secondary phase constituents, including martensite, is not too high to risk promoting extensive stress localisation upon deformation, which would impair stretch-flange formability and/or fatigue resistance. Furthermore, to compensate for the consequently limited possibility to use transformation hardening to increase the strength of the steel by incorporating martensite, a well designed matrix is realised that provides a high yield strength ($R_{p0.2}$) combined with a high yield ratio (YR=yield ratio=Yield Strength/Tensile Strength=$R_{p0.2}$/$R_m$). The matrix consists of a mixture of polygonal ferrite (PF) and bainitic ferrite (BF) wherein the PF and BF is precipitation-strengthened with fine composite carbides and/or carbo-nitrides of V and/or of Mo and optionally of Ti and/or of Nb. The nanometer-sized precipitates achieve the desired strength level and suppress the formation of (coarse) cementite or pearlite by tying up C in the precipitates.

The matrix makes up at least 95 vol. % of the overall microstructure. Embedded in and between the bainitic ferrite constituents of the matrix is a small but significant amount of at least 0.5 vol. % and at most 5 vol. % of the overall microstructure of martensite (M) and retained-austenite (RA) phase constituents (i.e. Σ(M+RA) is ≥0.5 vol. % and ≤5 vol. %), which suppress discontinuous yielding and yield point elongation without significant deterioration of hole-expansion capacity (or stretch-flange formability) or fatigue resistance. This combination of the matrix with the small M and/or RA islands can be identified as granular bainite. In order to obtain the right balance between continuous yielding on the one hand and good hole-expansion capacity and fatigue resistance on the other, the amount of M and/or RA should be limited to at most 5 vol. %. A preferable minimum amount is 0.8 vol. %. A preferable maximum amount is 4 vol. %. It is important to ensure that the formation of the BF constituents is realised at temperatures at which the precipitation kinetics of micro-alloying elements, including V, are still sufficiently fast to allow substantial precipitation hardening and to suppress the formation of (coarse) cementite or even pearlite, which could impair hole-expansion capacity. To achieve this, a sufficient amount of Mo and the optional Cr in addition to other alloying elements that can sufficiently promote the bainitic transformation is needed. It should be noted that the overall microstructure consists of the matrix, M and RA, wherein the matrix consists of (precipitation hardened) PF and BF. So, it is the intention of that the steel according to the invention has an overall microstructure consisting of PF, BF, M and RA wherein Σ(PF, BF, M, RA)=100 vol. %. The overall microstructure is therefore free from other microstructural components, and in particular free from carbon-rich microstructural components such as coarse cementite or pearlite. However, insignificant and/or unavoidable amounts of these other microstructural components which do not materially affect the properties or performance of the steel according to the invention may be allowable.

In an embodiment the steel strip or sheet has a tensile strength of 950 MPa or higher.

In an embodiment the steel strip or sheet comprises (in wt. %):
 at least 0.08%, and/or
 at least 0.15% Mo, and/or
 at least 0.15 or at least 0.20% Cr, and/or
 at least 0.02% Nb.

In an embodiment the microstructure of the steel strip or sheet according to the invention contains at least 0.8% of Σ(M+RA) and/or the matrix contains (in volume percent of the matrix) at least 60% BF and at most 40% PF, preferably at least 80% BF and at most 20% PF.

A substantial amount of precipitation hardened PF can be tolerated in the matrix because it can provide increased tensile elongation. However, it is preferred that its volume fraction is at most 60 vol. % of the matrix, or more preferably at most 40 vol. %, or most preferably at most 20 vol. %, since too high a fraction of PF will lead to a loss in strength and can furthermore introduce discontinuous yielding and yield point elongation, which is to be avoided in the present invention.

In an embodiment of the invention the sum of the intensity of the misorientation angles between 20° and 50° in a normalised MisOrientation angle Distribution (MOD) profile of the microstructure as measured with the Electron BackScatter Diffraction technique is at most 0.50, preferably at most 0.40, more preferably at most 0.20.

In an embodiment the MisOrientation angle Distribution (MOD) index of the microstructure as measured with the Electron BackScatter Diffraction technique is at least 0.45, preferably at least 0.65, more preferably at least 0.85.

In an embodiment the composition of the steel strip or sheet according to the invention in case Ti is at least 0.01% satisfies the following equations:

$$0.2 \leq \left( \frac{\left(\frac{Mo}{96}\right)}{\left(\frac{Nb}{93}\right)+\left(\frac{Ti^*}{48}\right)+\left(\frac{V}{51}\right)} \right) \leq 2.0 \text{ and}$$

$$0.7 \leq \left( \frac{\left(\frac{Nb}{93}\right)+\left(\frac{Ti^*}{48}\right)+\left(\frac{V}{51}\right)+\left(\frac{Mo}{96}\right)}{\left(\frac{C}{12}\right)} \right) \leq 2.2$$

with $Ti^* = Ti_{total} - \left(\left(\frac{N}{14}\times 48\right)+\left(\frac{S}{32}\times 48\right)\right)$.

Preferably wherein $$0.2 \leq \left( \frac{\left(\frac{Mo}{96}\right)}{\left(\frac{Nb}{93}\right)+\left(\frac{Ti^*}{48}\right)+\left(\frac{V}{51}\right)} \right) \leq 2.0 \text{ and}$$

$$1.0 \leq \left( \frac{\left(\frac{Nb}{93}\right)+\left(\frac{Ti^*}{48}\right)+\left(\frac{V}{51}\right)+\left(\frac{Mo}{96}\right)}{\left(\frac{C}{12}\right)} \right) \leq 2.2$$

with $Ti^* = Ti_{total} - \left(\left(\frac{N}{14}\times 48\right)+\left(\frac{S}{32}\times 48\right)\right)$.

In these equations, and those that follow, if an element is indicated with the code as used in the Periodic Table, such as for example Mo, then this means that the wt. % of that element has to be entered in the equation.

In an embodiment the composition of the steel strip or sheet according to the invention in case Ti is at most 0.005% (i.e. Ti is an unavoidable impurity and not a deliberate alloying element) satisfies the following equations:

$$Al_{sol} - \left(\frac{N}{14}\times 27\right) \geq 0, \text{ and}$$

-continued $$0.2 \leq \left(\frac{\left(\frac{Mo}{96}\right)}{\left(\frac{Nb}{93}\right)+\left(\frac{V}{51}\right)}\right) \leq 2.0, \text{ and}$$

$$0.7 \leq \left(\frac{\left(\frac{Nb}{93}\right)+\left(\frac{V}{51}\right)+\left(\frac{Mo}{96}\right)}{\left(\frac{C}{12}\right)}\right) \leq 2.2.$$

Preferably wherein $$Al_{sol} - \left(\frac{N}{14} \times 27\right) \geq 0, \text{ and}$$

$$0.2 \leq \left(\frac{\left(\frac{Mo}{96}\right)}{\left(\frac{Nb}{93}\right)+\left(\frac{V}{51}\right)}\right) \leq 2.0, \text{ and}$$

$$1.0 \leq \left(\frac{\left(\frac{Nb}{93}\right)+\left(\frac{V}{51}\right)+\left(\frac{Mo}{96}\right)}{\left(\frac{C}{12}\right)}\right) \leq 2.2.$$

In an embodiment the composition of the steel strip or sheet according to the invention in case Ti is at most 0.005% (i.e. Ti is an unavoidable impurity and not a deliberate alloying element) satisfies the following equations:

$$Al_{sol} - \left(\frac{N}{14} \times 27\right) < 0, \text{ and}$$

$$0.2 \leq \left(\frac{\left(\frac{Mo}{96}\right)}{\left(\frac{X}{51}\right)}\right) \leq 2.0, \text{ and}$$

$$0.7 \leq \left(\frac{\left(\frac{X}{51}\right)+\left(\frac{Mo}{96}\right)}{\left(\frac{C}{12}\right)}\right) \leq 2.2,$$

with $X = V + \left(\frac{Nb}{93} \times 51\right) - \left(\frac{N^*}{14} \times 51\right)$ and $N^* = N - \left(\frac{Al_{sol}}{27} \times 14\right)$ Preferably wherein $$Al_{sol} - \left(\frac{N}{14} \times 27\right) < 0, \text{ and}$$

$$0.2 \leq \left(\frac{\left(\frac{Mo}{96}\right)}{\left(\frac{X}{51}\right)}\right) \leq 2.0, \text{ and}$$

$$1.0 \leq \left(\frac{\left(\frac{X}{51}\right)+\left(\frac{Mo}{96}\right)}{\left(\frac{C}{12}\right)}\right) \leq 2.2,$$

with $X = V + \left(\frac{Nb}{93} \times 51\right) - \left(\frac{N^*}{14} \times 51\right)$ and $N^* = N - \left(\frac{Al_{sol}}{27} \times 14\right)$ In an embodiment the high-strength hot-rolled steel strip or sheet according to the invention has a tensile strength (TS), total elongation (El), and sheet thickness t (mm) satisfying the equation of $(TS \times El)/t^{0.2} > 12000$ and one of the following (i to vi):

i. a YR of at least 0.7 and a HER of 40% or higher, or
ii. a YR of at least 0.8 and a HER of 40% or higher, or
iii. a YR of at least 0.7 and a HER of 50% or higher, or
iv. a YR of at least 0.8 and a HER of 50% or higher, or
v. a YR of at least 0.7 and a HER of 60% or higher, or
vi. a YR of at least 0.8 and a HER of 60% or higher.

In an embodiment the steel strip or sheet according to the invention is provided with a metallic coating on the upper and/or lower surface, preferably a zinc based coating. The coating of the hot-rolled strip with a metallic coating can e.g. be done in an electrolytic deposition process, or by hot dipping in a heat-to-coat (HTC) cycle where the temperature during the HTC-cycle is kept as low as possible to avoid an adverse influence on the properties of the steel. The term upper and/or lower surface refer to the major surfaces of the strip.

In an embodiment the thickness of the hot-rolled strip or sheet is at least 1.0 mm, and at most 5.0 mm. A suitable maximum thickness is 3.7 mm. Preferably the thickness is at least 1.25 mm and/or at most 3.5 mm. A suitable maximum thickness is 3.2 mm. More preferably the thickness is at least 1.50 mm and/or at most 3.0 mm.

Continuous yielding can be defined as a steel having a value of Ae of at most 0.1%, and preferably having a value of 0. Preferably YR is at least 0.70.

The role of the individual alloying elements will now be described. All compositions are given in wt. %, unless indicated otherwise.

Carbon (C) is added to form carbide and/or carbo-nitride precipitates with V and Mo, and optionally with Ti and/or Nb and to promote a small but significant fraction of M and/or RA embedded in the bainitic ferrite (BF), which can be defined as a granular bainite matrix. This Σ(M+RA) is ≥0.5 vol. % and ≤5 vol. % and is crucial to suppress discontinuous yielding and yield point elongation, which is considered positive for the roll-forming performance of the steel strip or sheet. The amount of C needs to be sufficiently high to promote a sufficient amount of granular bainite at transformation temperatures that still provide sufficient precipitation kinetics to achieve substantial precipitation hardening based on V, Mo, and optionally Ti and/or Nb. At the same time, the amount of C is dependent on the amount of precipitation hardening that is desired to achieve a steel strip or sheet with a tensile strength of at least 780 MPa, Moreover, the formation of (coarse) cementite and/or pearlite is to be suppressed, since the presence of these phase constituents can impair hole-expansion capacity. This means that the amount of C must be high enough for forming precipitates with V, Mo, and optionally Ti and/or Nb, and low enough to prevent the formation of cementite and/or cementite. Therefore the amount of C has to be between 0.05% and 0.14%. Preferably, the C content is at least 0.08%.

Silicon (Si) is beneficial for solid-solution strengthening and suppressing the formation of cementite and/or pearlite. The latter is highly relevant since pearlite and/or cementite impair stretch-flange formability and fatigue resistance. However, a low Si content is desired to reduce rolling loads and to avoid scale issues, which can impair fatigue properties of the steel strip or sheet. Therefore, the Si content should not exceed 0.5%. A suitable minimum Si content is 0.05%. A suitable maximum Si content is 0.3%.

Manganese (Mn) is important since it provides solid-solution strengthening of the matrix, and decreases the $Ar_3$-transformation temperature, thereby promoting grain refinement and stimulating, in combination with other alloying elements like Mo and/or Cr, the formation of low-temperature transformation products including granular bainite consisting of M and/or RA embedded in a bainitic matrix (BF). Furthermore, Mn slows down the transformation rate, which can contribute to interphase precipitation and hence a relatively homogeneous and fine distribution of carbide and/or carbo-nitride precipitates to optimise precipitation hardening. Therefore, the Mn content should be at least 1.0%. However, too high a Mn content will lead to (centre line) segregation, which will promote splitting upon punching or cutting of the steel strip or sheet and which in turn impairs the stretch-flange formability of the steel strip or sheet. Hence, the Mn content should be in the range of 1.0 and 2.0%. A suitable minimum Mn content is 1.20%. A suitable maximum Mn content is 1.9%.

A low sulphur (S) content is beneficial for formability. Therefore, a low S content is needed to obtain a high hole-expansion capacity. A calcium (Ca) treatment for inclusion control may be desired to improve castability and to modify MnS. The S content should be at most 0.008%, preferably at most 0.005%. If a calcium treatment is used, the calcium content of the steel strip or sheet generally does not exceed 100 ppm, and is usually between 5 and 70 ppm.

Phosphor (P) is a potent solid-solution strengthening element. However, at high levels, P centre line segregation can promote splitting upon punching and promote intergranular cleavage when it is segregated to grain boundaries. As such, high P levels will impair stretch-flange formability. Therefore, the P content should be 0.04% or less, preferably at most 0.01%, more preferably at most 0.005%.

Aluminium (Al) is added as a deoxidiser and can contribute to grain size control during reheating and hot rolling of the steel strip or sheet by the presence of AlN precipitates in the austenite phase. The Al content in the steel (Al_tot) consists of Al bound into oxides (Al_ox) as a result of the killing of the steel, and which have not been removed from the melt during steelmaking and casting, and a remainder of Al, either in solid solution in the steel matrix or present as Aluminium nitride precipitates. The Al in solid solution in the steel matrix and the Al present as nitride precipitates may be dissolved in acid to measure its content and this is defined as soluble aluminium (Al_sol). Too high Al_sol will impair stretch-flange formability. Therefore, the amount of Al_sol should be at most 0.1%. The preferred amount of Al_sol depends on the presence and content of V and Ti as precipitation strengthening elements in the steel.

The precipitation strengthening effect of V can be increased by promoting the formation of nitride (VN) and/or carbo-nitride (VCN) precipitates at the expense of carbide (VC) precipitates by using elevated levels of N. Reason for this is the fact that VN and VCN precipitates due to their lower solubility product are thermally more stable than VC and hence are less prone to coarsening during coiling. Consequently, the smaller size of VN and VCN precipitates will contribute to a higher degree of precipitation strengthening. In order to have N as much as possible available for VN and VCN precipitation, it is recommended to use a low level of Al because Al is an effective N scavenger. In this case, it is preferred to use a relatively low Al_sol level of at most 0.07% or more preferably of at most 0.025%.

Beside V, Ti may also be also added to achieve substantial precipitation strengthening (i.e. the amount of added Ti is higher than the typical and inevitable impurity in industrially produced steel strip or sheet). In that case, the use of elevated N levels is to be avoided since this will promote TiN or TiVN formation, which will not or only partially dissolve during industrial slab reheating conditions in a hot-strip mill. Moreover, TiN tends to precipitate as large cuboid inclusions, which can act as stress raisers and hence constitute potential nucleation sites for void and micro-crack formation in the steel strip or sheet upon deformation, which leads to a degradation of stretch-flange formability and/or fatigue resistance. Therefore, if both V and Ti are used for precipitation strengthening of the steel strip or sheet, then the need to use a low level of Al is absent. In this case, it is preferred to use an Al_sol content between 0.025 to 0.1%.

Nitrogen (N) is a beneficial element to promote carbo-nitride precipitation at the expense of carbide precipitation. Hence, in case of V precipitation strengthening, an elevated level of N is beneficial to increase the contribution of V to precipitation strengthening of the matrix of the steel strip or sheet. As stated before, this does not apply when beside V also Ti is added for precipitation strengthening. A combination of an elevated level of Ti and N will promote TiN and TiVN. These types of nitride precipitates have a relatively low solubility product in the austenite phase and hence will not or only partially dissolve during industrial slab reheating in the temperature range of 1050 to 1250° C. This reduces the effectiveness of both V as well as Ti to create precipitation strengthening of the final microstructure of the steel strip or sheet. Furthermore, elevated levels of N in combination with Ti lead to the aforementioned formation of large cuboid TiN inclusions, which can impair formability and fatigue resistance. If apart from an optional moderate amount of Nb for predominantly grain refinement, V is used without Ti-additions, then it is preferred to use a relatively high N level of at most 0.02%. If Ti is added for precipitation strengthening in combination with V, then it is preferred to use a relatively low N level of at most 0.006%, preferably 0.003%, or most preferably at most 0.001%.

Niobium (Nb) provides grain refinement and to a lesser extent some precipitation hardening. Grain refinement is of importance for a good balance between strength and formability and is believed to contribute to improved fatigue resistance. On the other hand, Nb also retards recrystallisation during hot rolling and therefore, elevated levels of Nb can lead to (too) high rolling forces. Its presence in this invention is therefore optional and, if used, limited to an amount of 0.1%, and preferably at least 0.02%, more preferably at least 0.035%.

Vanadium (V) provides precipitation strengthening. The precipitation strengthening based on fine V containing carbide and/or carbo-nitride precipitates is crucial to achieve the desired strength level based on a (granular) bainite microstructure in combination with high elongation and high hole-expansion capacity. With respect to formability, V is one of the micro-alloying elements that is crucial to substantially tie up C in the carbide and/or carbo-nitride precipitation process and to suppress the formation of (coarse) inter- and intralath cementite in the bainitic matrix, which can impair formability. For this the minimum V content is 0.1%. Too much V can lead to (centre line) segregation, which can promote splitting upon punching or cutting of the steel strip or sheet, impairing the stretch-flange formability of the steel strip or sheet. Hence, the V content should be in the range of 0.10 to 0.40%. A suitable minimum V content is at least 0.15%. A suitable maximum V content is at most 0.35%, more preferably at most 0.32%, and most preferably at most 0.25%.

Titanium (Ti) combines grain refinement with precipitation strengthening. The grain refinement is of importance for a good balance between strength and elongation. Furthermore, precipitation strengthening from Ti may be desired to achieve sufficient strengthening of the (granular) bainite microstructure and hence to achieve desired yield and tensile strength of the steel strip or sheet. However, its use can lead to the formation of relatively large cuboid TiN inclusions, which can impair formability, in particular with respect to hole-expansion capacity, and/or fatigue resistance. Furthermore, like Nb, Ti also retards recrystallisation during hot rolling and hence can prevent sufficient austenite grain refinement during austenitic hot rolling, leading potentially to too high rolling forces. Hence, the use of Ti is optional in the present invention and when used to achieve sufficient precipitation strengthening, a suitable range for Ti is 0.01 to 0.14%. A suitable maximum Ti content—if used—is 0.12%, or more preferably 0.08%, or most preferably 0.05%. A suitable minimum Ti content—if used—is 0.02%.

Molybdenum (Mo) suppresses the formation of cementite and pearlite and offers hardenability by promoting a bainitic microstructure, in particular when combined with the use of Cr. Mo promotes the formation of a bainitic microstructure at elevated temperatures, thus allowing coiling at higher temperatures. These higher temperatures provide sufficient precipitation kinetics to stimulate substantial precipitation strengthening. As a carbide former, Mo plays a relevant role in the formation of composite carbide and/or carbo-nitride precipitates containing—in addition to Mo—V and optionally Ti and/or Nb in the present invention. Furthermore, Mo strongly retards the migration velocity of the austenite-to-ferrite ($\gamma \rightarrow \alpha$) transformation interface and hence slows down phase $\gamma \rightarrow \alpha$ transformation of the steel strip or sheet during cooling and coiling. When used in elevated levels, this allows precipitation, which is inherently a relatively slow process, to follow phase transformation, promoting interphase precipitation. It is believed that Mo contributes to the thermal stability of carbide and/or carbo-nitride precipitates containing V and optionally Ti and/or Nb, which reduces the coarsening rate of the precipitates during coiling in the hot-strip mill once the composite carbides and/or carbo-nitride precipitates are formed. As such, Mo is beneficial to suppress loss in precipitation strengthening during coiling, which allows a more efficient use of micro-alloying elements V, Ti, and/or Nb. Hence, the Mo content should be in the range of 0.05 and 0.7%. A suitable minimum Mo content is 0.15%, or more preferably 0.25%. Preferably the Mo content is at most 0.55%, or more preferably at most 0.45%.

Chromium (Cr) provides hardenability and promotes a bainitic microstructure, in particular when combined with Mn and Mo. In order to achieve a bainitic microstructure under industrially relevant cooling and coiling conditions, which also still allow substantial precipitation hardening based on carbide and/or carbo-nitride precipitates, the use of Cr may be required in addition to Mn and Mo. Reason for this is that high levels of Mn may lead to segregation and hence can lead to deterioration of formability. On the other hand, too high levels of Mo may be equally not desired since this leads to high alloy costs. Hence the use of Cr is optional and—when used—should be in the range of 0.1 to 1.2%. A suitable minimum Cr content is 0.20%. A suitable maximum Cr content is 1.0%, more preferably 0.73% or even more preferably 0.45%.

Boron (B) provides hardenability and its use is optional for the present invention. If used, the B content should be at most 0.003%.

According to a second aspect, a method of manufacturing a high-strength hot rolled steel strip or sheet with tensile strength of 780 MPa or higher with continuous yielding behaviour and an excellent combination of total elongation, stretch-flange formability, and fatigue resistance, the method comprising the step of casting a thick or thin slab, comprising (in wt %):

between 0.05 and 0.14% C;
between 1.0 and 2.0% Mn;
between 0.05 and 0.7% Mo;
between 0.10 and 0.40% V;
optionally one or more of
   at least 0.1 and/or at most 1.2% Cr;
   at least 0.01 and/or at most 0.14% Ti;
   at least 0.01 and/or at most 0.10% Nb;
at most 0.5% Si;
at most 0.04% P;
at most 0.008% S;
at most 0.1% Al_sol;
at most 0.020% N;
at most 0.003% B;
optionally Ca in an amount consistent with a calcium treatment for inclusion control;
balance Fe and inevitable impurities;

followed by the step of reheating the solidified slab to a temperature of between 1050 and 1250° C., hot rolling the steel slab and finishing said hot rolling at a finish hot rolling temperature at the $Ar_3$-temperature or higher, and coiling the hot rolled steel strip or sheet in the temperature range between 450 and 620° C. to produce a microstructure that contains a matrix consisting of a mixture of polygonal ferrite (PF) and bainitic ferrite (BF) and at most 5% of $\Sigma$(martensite and retained-austenite), wherein the PF and BF is precipitation-strengthened with fine composite carbides and/or carbo-nitrides of V and/or of Mo and optionally of Ti and/or of Nb, wherein the overall microstructure contains at least 0.8% of $\Sigma$(M+RA) and wherein the matrix contains (in volume percent of the matrix) at least 40% BF and at most 60% PF. Preferably the coiling temperature is at least 500° C. and/or at most 610° C. Most preferably the coiling temperature is at least 520 and/or at most 600° C.

In an embodiment the hot-rolled steel strip or sheet is cooled to the coiling temperature at an average cooling rate of at least 10° C./s and at most 150° C./s. Preferably this average cooling rate is at least 40° C./s.

In an embodiment the coiled hot-rolled steel strip or sheet is subjected to cooling by immersing the coil into a water basin after coiling or by actively cooling the coil after coiling, e.g. with a spray of water.

In view of the microstructure containing at least 95% of a mixture of precipitation-strengthened PF and BF (matrix) and up to 5% of M and/or RA to realise continuous yielding behaviour and suppress yield point elongation without substantially lowering the yield strength or YR and without impairing stretch-flange formability and/or fatigue resistance, the alloy composition and process conditions with regard to the run-out-table and/or coiler should be set in such a way that transformation and precipitation kinetics are well controlled and can act in parallel to allow the desired microstructure. The chosen combination of reheating temperature, finish rolling conditions, coiling temperature and cooling conditions enable achieving this.

According to a third aspect, a part is provided, preferably an automotive part, more preferably a chassis part, or most preferably a roll-formed automotive chassis part, using the high-strength hot-rolled steel strip or sheet according to any one of the claims 1 to 10 and 14, preferably wherein the steel strip has a tensile strength (TS), total elongation (El), and sheet thickness t (mm) that satisfy the equation of $(TS \times El)/t^{0.2} > 12000$ and one of the following (i to vi) preferably wherein the steel strip has and
  i. a YR of at least 0.7 and a $\lambda$ of 40% or higher, or
  ii. a YR of at least 0.8 and a $\lambda$ of 40% or higher, or
  iii. a YR of at least 0.7 and a $\lambda$ of 50% or higher, or iv. a YR of at least 0.8 and a λ of 50% or higher, or
v. a YR of at least 0.7 and a λ of 60% or higher, or
vi. a YR of at least 0.8 and a λ of 60% or higher.

The invention will now be further explained by means of the following non-limitative examples.

EXAMPLE 1

Steels A to E having the chemical compositions shown in Table 1 were hot-rolled under the conditions given in Table 2, producing sheets 1A to 10E. Prior to tensile testing, the hot-rolled sheets were pickled and the pronounced surface roughness of the sheets due to the laboratory rolling was removed by thinning the sheets with an initial as-rolled thickness of circa 3.5 mm using gentle grinding to a final thickness as shown in Table 2.

The reported tensile properties of sheets 1A to 10E in Table 2 are based on JISS tensile geometry with tensile testing parallel to the rolling direction according to EN 10002-1/ISO 6892-1 (2009) (Rp0.2=0.2% offset proof or yield strength; Rm=ultimate tensile strength; YR=yield ratio defined as Rp0.2 over Rm; A=tensile elongation; ReH=upper proof or yield strength; ReL=lower proof or yield strength; Ae=yield point elongation). To determine the hole-expanding ratio λ, which is a criterion for stretch-flangeability, three square samples (90×90 mm²) were cut out from each sheet, followed by punching a hole of 10 mm in diameter in the sample. Hole-expansion testing of the samples was done with upper burring. A conical punch of 60° was pushed up from below and the hole diameter $d_f$ was measured when a through-thickness crack formed. The hole-expansion ratio λ was calculated using the formula below with $d_0$=10 mm:

$$\lambda = \frac{d_f - d_0}{d_0} \times 100\%$$

The λ of sheets 1A to 10E are reported in Table 2, together with normalised hole-expansion ratios ($\lambda_N$) with the λ of sheet 2A set to the numerical value of 1.

The microstructures of sheets 1A to 10E were characterised with Electron BackScatter Diffraction (EBSD) to identify the prevalent character of the microstructure and to determine its phase constituents and fractions. To this purpose the following procedures were followed with respect to sample preparation, EBSD data collection and EBSD data evaluation.

The EBSD measurements were conducted on cross sections parallel to the rolling direction (RD-ND plane) mounted in a conductive resin and mechanically polished to 1 μm. To obtain a fully deformation free surface, the final polishing step was conducted with colloidal silica (OPS).

The Scanning Electron Microscope (SEM) used for the EBSD measurements is a Zeiss Ultra 55 machine equipped with a Field Emission Gun (FEG-SEM) and an EDAX PEGASUS XM 4 HIKARI EBSD system. EBSD scans were collected on the RD-ND plane of the sheets. The samples were placed under a 70° angle in the SEM. The acceleration voltage was 15 kV with the high current option switched on. A 120 μm aperture was used and the working distance was 17 mm during scanning. To compensate for the high tilt angle of the sample, the dynamic focus correction was used during scanning.

The EBSD scans were captured using the TexSEM Laboratories (TSL) software OIM (Orientation Imaging Microscopy) Data Collection version 7.0.1. Typically, the following data collection settings were used: Hikari camera at 6×6 binning combined with standard background subtraction. The scan area was in all cases located at a position of ¼ the sample thickness and care was taken not to include non-metallic inclusions in the scan area.

The EBSD scan size was in all cases 100×100 μm, with a step size of 0.1 μm, and a scan rate of 80 frames per second. For the EBSD measurements, Fe(α) and Fe(γ) were included during scanning. The Hough settings used during data collections were: Binned pattern size of circa 96; theta set size of 1; rho fraction of circa 90; maximum peak count of 13; minimum peak count of 5; Hough type set to classic; Hough resolution set to low; butterfly convolution mask of 9×9; peak symmetry of 0.5; minimum peak magnitude of 5; maximum peak distance of 15.

The EBSD scans were evaluated with TSL OIM Analysis software version 7.1.0.×64. Typically, the data sets were 90° rotated over the RD axis to get the scans in the proper orientation with respect to the measurement orientation. A standard grain dilation clean up was performed (Grain Tolerance Angle (GTA) of 5°, a minimum grain size of 5 pixels, criterion used that a grain must contain multiple rows for a single dilation iteration clean up). For the samples from sheets coiled at 600° C., the percentage of cleaned up points was typically 0.5%, whereas for the samples from sheets coiled at 630° C., the percentage of cleaned up points was typically 1%. The first step in the evaluation of the EBSD data was done creating two partitions, i.e., Fe(α) and Fe(γ). The latter was identified as retained-austenite (RA). The next step consisted of splitting the Fe(α) partition into a Fe(α) partition with a high average Image Quality (IQ) and a Fe(α) partition with a low average IQ. With the given experimental conditions, this was IQ>1250 and IQ≤1250, respectively. The low IQ Fe(α) partition was identified as martensite (M), The high IQ Fe(α) partition was identified as a mixture of BF and PF.

The MisOrientation angle Distribution (MOD) index of the high IQ Fe(α) partition was calculated using the following method: the normalised misorientation angle distribution, including all boundaries, ranging from misorientation angles of 5° to 65° with a binning of 1°, was calculated from the partitioned EBSD data set using the TSL OIM Analysis software. Similarly, the normalised theoretically misorientation angle distribution of randomly recrystallised PF was calculated with the same misorientation angle range and binning as the measured curve. In practice this is the so-called "MacKenzie" based misorientation angle distribution included in the TSL OIM Analysis software. Normalisation of the misorientation angle distribution means that the area below the misorientation angle distribution is defined as 1. The MOD index is then defined as the area between the theoretical curve (the dashed line) and the measured curve (the solid line) in FIG. 1a (top figure) and 1b (bottom figure)—and can be defined as:

$$MOD \text{ index} = \sum_{i=5}^{65} |R_{MOD,i} - M_{MOD,i}|$$

with $M_{MOD,i}$ as the intensity at angle i (ranging from 5° to 65°) of the measured misorientation angle distribution and $R_{MOD,i}$ as the intensity at angle i of the theoretical or "McKenzie" based misorientation angle distribution of randomly recrystallised PF.

Figure 1B:
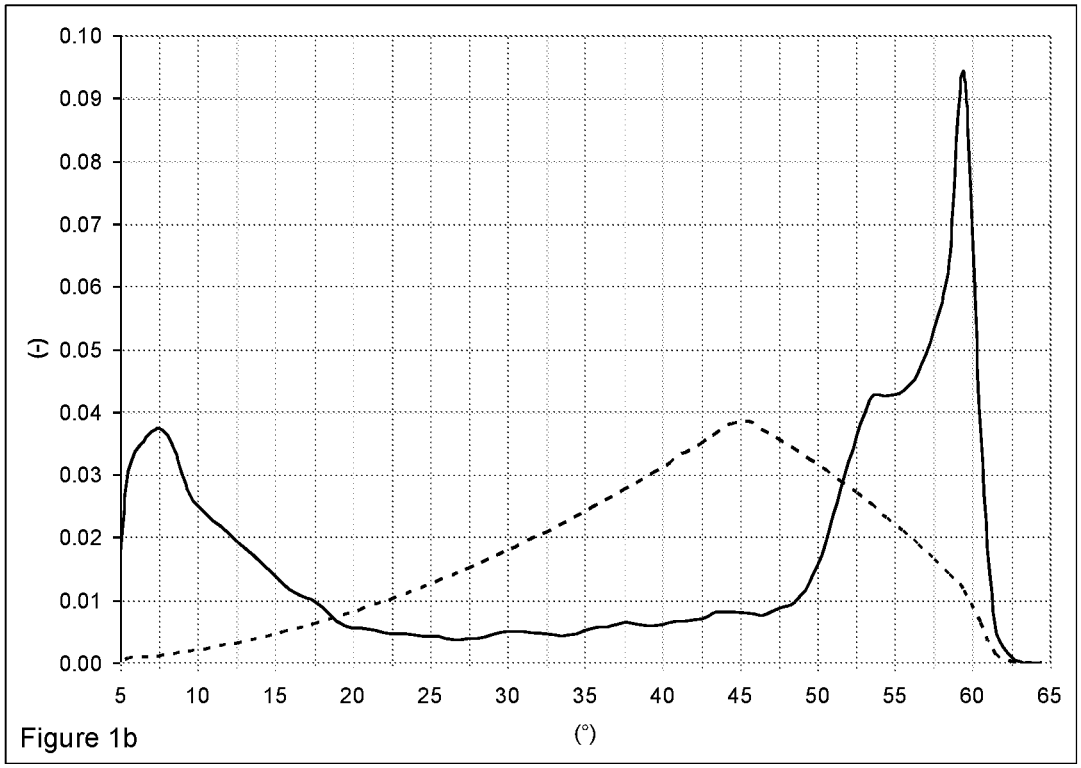

The solid line in FIG. 1a and 1b represents the measured misorientation angle distribution and the dashed curve represents the theoretical misorientation angle curve for a randomly recrystallised polygonal ferritic structure. FIG. 1a shows a misorientation angle distribution curve of a sample with a microstructure having a predominantly polygonal ferritic character. FIG. 1b shows a misorientation angle distribution curve of a sample with a microstructure having a predominantly bainitic character. The MOD index ranges by definition from 0 to almost 2: when the measured curve is equal to the theoretical curve, the areas between the two curves is 0 (MOD index will be 0), whereas if there is (almost) no intensity overlap between the two distribution curves, the MOD index is (almost) 2.

So, as illustrated in FIG. 1, the misorientation angle distribution contains information on the nature of the microstructure and the MOD index can be used to assess the character of a microstructure based on a quantitative and hence more unambiguous approach than based on conventional methods such as light-optical microscopy. A fully PF microstructure will have a unimodal misorientation angle distribution with most of the intensity in the 20°-50° range and a peak intensity around 45°. In contrast, a fully bainitic microstructure will have a strong bimodal misorientation angle distribution with peak intensities in between 5°-10° and 50°-60° and little intensity in the range of 20°-50°. Hence, a low MOD index and a high 20°-50° MOD intensity in the present example is a clear signature of a predominantly polygonal ferritic microstructure, whereas a high MOD index and a low 20°-50° MOD intensity is a clear signature of a predominantly bainitic microstructure.

Figure 2:
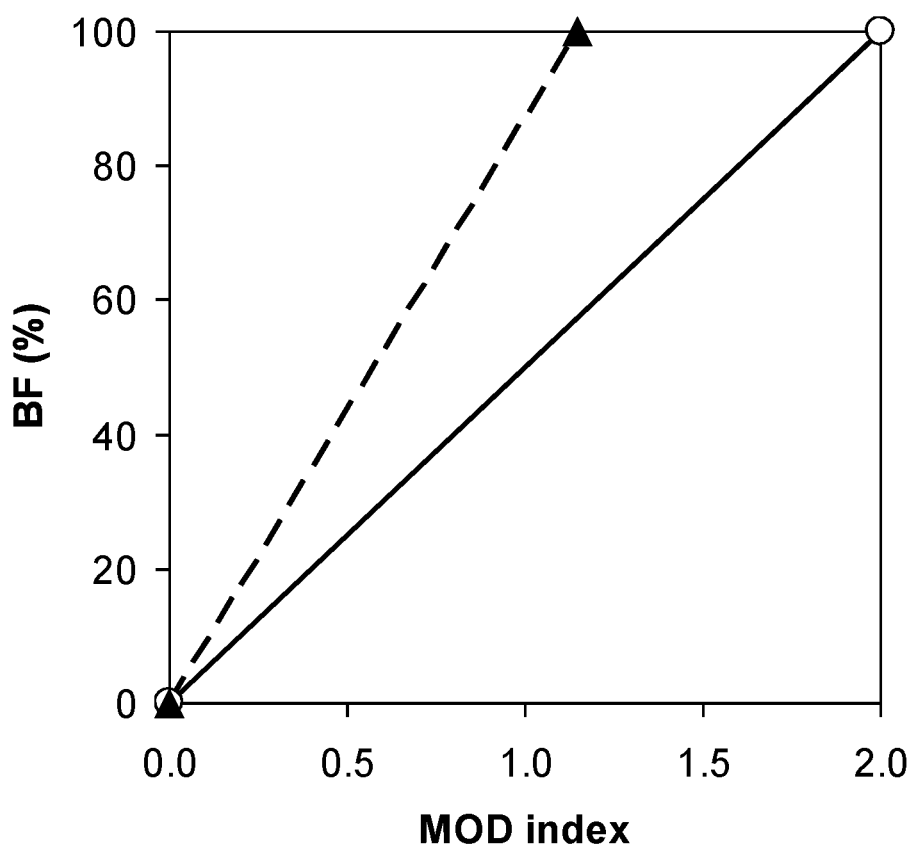

Apart from a qualitative assessment of the character of the matrix in terms of BF versus PF, the MOD index was also used to determine quantitatively the volume fractions of BF and PF. FIG. 2 shows a graph with the volume fraction BF (vol. %) plotted against the MOD index, in which a linear relationship between volume fraction BF and MOD index is assumed. The solid black line with open circles at 0 and 100% BF illustrates the theoretical relationship of the amount of BF as a function of the MOD index. However, the inventors have found that a microstructure with a MOD index in the range of 1.1 to 1.2 can already be classified based on conventional light-optical microscopy as exclusively or 100% BF. Hence, in the present example, a more empirical relationship between the volume fraction BF and MOD index was found where a 100% PF type of microstructure has a MOD index of 0 and a 100% BF type of microstructure has a MOD index of 1.15. This relationship is illustrated with the dashed line in FIG. 2 with closed triangle symbols at 0 and 100% BF and is given by:

$$BF_{matrix} = 86.96 \times MOD\ index$$

In the present case, the amount of PF is assumed to be $$PF_{matrix} = 100 - BF_{matrix}$$

with $BF_{matrix}$ and $PF_{matrix}$ expressed in volume percent of the matrix. The overall volume fractions in percent of the overall microstructure for BF and PF are calculated by scaling $BF_{matrix}$ and $PF_{matrix}$ by $$BF = BF_{matrix} \times f_{matrix}\ \text{and}\ PF = PF_{matrix} \times f_{matrix}$$

with $f_{matrix}$ defined as the volume fraction of the matrix in percent of the overall microstructure (i.e., at least 0.95 (or 95%)).

The EBSD procedure as described here was used to identify the character of the microstructure of the sheets 1A to 10E based on aforementioned MOD index and 20°-50° MOD intensity. Furthermore, the high IQ Fe(α) partition was used to quantify the fraction of the sum of polygonal ferrite and bainitic ferrite (PF+BF), and the sum of the low IQ Fe(α) partition and the Fe(γ) partition was used to quantify the total fraction of martensite and retained-austenite (M+RA). The calculated fractions (PF+BF), (M+RA), as well as the MOD index, and 20°-50° MOD intensity of sheets 1A to 10E are shown in Table 2 as well as the volume fractions of BF and PF expressed in volume percent of the overall microstructure as determined based on the MOD index.

The results provided in Table 2 show that discontinuous yielding and yield point elongation can be effectively suppressed by lowering the coiling temperature for steels A to E shown in Table 1 from 630° C. to 600° C. As the coiling temperature is decreased from 630 to 600° C., a small but significant increase in the fraction of M+RA is realised. In turn, this presence of M+RA phase constituents in the final microstructure suppresses effectively discontinuous yielding and yield point elongation (Ae) and promotes a continuous work hardening response. At the same time, the loss in yield ratio (=YR) is kept to a minimum with lowering the coiling temperature by 30° C. from 630 to 600° C. for sheets with compositions A to E and the YR of sheets 1A, 3B, 5C, 7D, and 9E obtained with coiling at 600° C. still remains relatively high with typical values above 0.7.

The results shown in Table 1 and 2 also show that an increase of Mo and/or Cr leads to an increase of the MOD index and a decrease of the 20°-50° MOD intensity, reflecting that an increase of Mo and/or Cr leads to an increase of the amount of bainitic character of the final microstructure. The MOD index of 1A and 3B with a relatively high Mo+Cr content of 0.495 and 0.651% is 0.87 and 1.09, respectively, whereas 5C and 7D with a considerably lower Mo+Cr content of circa 0.35 have a considerably lower MOD index of 0.49 and 0.57, respectively. Apart from promoting a more bainitic microstructure, increased Mo and/or Cr—and hence increased hardenability—also leads to an increase in the fraction of M+RA phase constituents in the final microstructure with coiling at 600° C. as used in Example 1. The microstructures of 1A and 3B produced with coiling at 600° C. and with a relatively high Mo+Cr content of 0.495 and 0.651% contain approximately 3.6 and 3.9% M+RA phase constituents, respectively, whereas the microstructures of 5C and 7D produced with coiling at 600° C. and with a relatively low Mo+Cr content of circa 0.35% contain a considerably lower M+RA fraction of approximately 1.3 and 1.6%. These results show that increased levels of Mo and/or Cr in fact promote a more granular bainitic type of microstructure, with granular bainite defined as a type of microstructure consisting of a BF phase constituents comprising small M+RA phase constituents. In fact, the results show that with compositions A to E and the Mo and Cr levels as shown in Table 1 a relatively high coiling temperature can already promote a substantial or even predominantly (granular) bainitic microstructure. The benefit of this is also that with these coiling temperatures, precipitation kinetics still allows considerably precipitation hardening to be achieved with micro-alloying elements like Nb and—foremost—V and Ti, enabling elevated strength levels to be achieved with a (granular) bainitic type of microstructure on the one hand and at the same time to tie up C in the precipitation process in order to suppress the formation of (coarse) cementite, either in BF or in the PF part of the matrix. This in turn is favourable to optimise the balance between hole-expansion capacity and tensile elongation together with high strength.

The benefit of substantial micro-alloying additions and the fact that C to a large extent is tied up in the carbide and/or carbo-nitride precipitation process leading to a decrease the amount of (inter- and intralath) cementite in the bainitic phase constituents and-or decrease the amount of grain boundary cementite or pearlite in between PF grains, can be rationalised as follows. Cementite or pearlite constituents can act as potential nucleation sites for (micro-)void formation upon deformation and hence reducing its amount will have a positive effect on both tensile elongation as well as hole-expansion ratio performance (see Example 2). This illustrates one of the main metallurgical features of the present invention, which is that a substantial or predominantly (granular) bainitic microstructure, that is commonly obtained with coiling temperatures around or below 550° C., can be achieved by using adequate levels of Mo and/or Cr at elevated coiling temperatures in the range of 550 to 600° C., where precipitation kinetics is still sufficient to achieve one the one hand substantial precipitation hardening and on the other to tie up C via carbide and/or carbo-nitride precipitation to suppress inter- and intralath cementite. This enables to combine relatively high strength levels with high formability, both in terms of tensile elongation as well as hole-expansion ratio (see Example 2).

A comparison between 1A to 8D versus 9E and 10E shows the characteristic and significant difference in performance with respect to λ when precipitation hardening element V is replaced by a high level of Ti. It is well-known that Ti alloying promotes the presence of large cuboid TiN inclusions, which in turn can act as stress raisers during punching and/or forming operations, leading to the formation of voids and/or small fractures in the microstructure. These microstructural defects may impair stretch-flange formability and can deteriorate fatigue resistance. The results shown in Table 2 confirm this. The stretch-flange formability as expressed by the hole-expansion ratio λ for the inventive V-alloyed 1A to 8D is substantially higher than that of the comparative Ti-alloyed sheets 9E and 10E. In particular with a relatively low coiling temperature of 600° C., the effect is strong. The value for λ of V-alloyed 1A, 3B, 5C, and 7D is in between 65 to 80%, whereas for Ti-alloyed steel sheet 9E λ is only 47%. These results indicate that too high a Ti content can lead to a substantial deterioration of hole-expansion capacity and hence is to be avoided. Nevertheless, the results also show that Ti is a potent precipitation hardening agent, in particular when a high tensile strength of at least 780 MPa, or preferably 950 MPa is desired. Therefore, Ti is considered in the present invention as an optional alloying element and—when used—its content is to limited to at most 0.14% and preferably used in combination with a low N content in order to avoid as much as possible the presence of (coarse) cuboid TiN inclusions.

The results of the present example show that in order to achieve an optimum balance between good stretch-flange formability on the one hand and good tensile performance characteristics for roll-forming operations (high yield stress/ratio and no discontinuous yielding and yield point elongation), a microstructure with a substantial or predominantly bainitic matrix and a small amount of M+RA phase constituents—or a so-called granular bainitic microstructure—offers a good trade-off between these properties, making these type of high-strength steels excellent candidates for automotive chassis and suspension applications in which excellent cold-forming performance related to cold stretchability and stretch-flangeability as well as good roll-forming performance related to aforementioned tensile properties are of importance.

EXAMPLE 2

Steels F to H having the chemical compositions shown in Table 1 were hot-rolled to a final thickness of circa 3.5 mm under the conditions given in Table 3, producing sheets 1F to 6H. Prior to tensile testing, the hot-rolled sheets were pickled.

The reported tensile properties of 1F to 6H in Table 3 are based on A50 tensile geometry (gauge length 50 mm) with tensile testing parallel to rolling direction according to EN 10002-1/ISO 6892-1 (2009). The reported normalised hole-expansion ratios ($\lambda_N$) of sheets 1F to 6H in Table 3 were determined as reported in Example 1 with the $\lambda_N$ of steel sheet 2F set to the numerical value of 1.

The microstructures of 1F to 6H were characterised by using Electron BackScatter Diffraction (EBSD) to identify the prevalent character of the microstructure and to determine its phase constituents and fractions. To this purpose identical procedures were followed with respect to sample preparation, EBSD data collection and EBSD data evaluation as those reported for Example 1. The fraction of the sum of polygonal ferrite and bainitic ferrite (PF+BF) and the fraction of the sum of martensite and retained-austenite (M+RA) together with the MOD index and 20°-50° MOD intensity of sheets 1F to 6H are reported in Table 3 as well as the volume fractions of BF and PF expressed in volume percent of the overall microstructure as determined based on the MOD index.

The tensile results shown in Table 3 illustrate that for alloys F and G as reported in Table 3 a decrease in coiling temperature form 630 to 600° C. suppresses discontinuous yielding behaviour and yield point elongation and promotes at a relatively high coiling temperature of 600° C. a substantially (granular) bainitic microstructure with a small fraction of M+RA phase constituents close to 1 to 1.5%.

A comparison between 1F and 3G coiled at 600° C. on the one hand and 5H coiled at 600° C. on the other, shows the effect and importance of micro-alloying on the balance between strength and formability. The yield strength and tensile strength of the V-alloyed 1F and 3G are close to 960 and 1045 MPa, respectively, whereas the yield strength and tensile strength of 5H with no V alloying are much lower with values of circa 640 and 750 MPa, respectively. The difference in yield and tensile strength between 1F and 3G versus 5H is around 300 MPa. This increase in strength is mainly delivered by the 0.3% V addition used for sheets 1A and 3B. At the same time, the reported A50 tensile elongation and $\lambda_N$ values of 1F, 3G, and 5H show that the 300 MPa increase in strength is not associated with a major loss in hole-expansion capacity. In fact, $\lambda_N$-values of 1F and 3G of 0.62 and 0.50, respectively, are close to that of 5H with a $\lambda_N$ of 0.55. Furthermore, also the A50 tensile elongation of 1F and 3G is close to that of 5H.

The relatively high hole-expansion ratios of 1F and 3G will largely be the result of the fact that cementite formation in the (granular) bainite microstructure is suppressed by tying up C in the carbide and/or carbo-nitride precipitation process. Since cementite may act as potential sites for the nucleation of voids and micro-cracks upon punching or fatigue testing, reducing the amount of cementite by using adequate levels of micro-alloying elements to tie up C fully or partially will contribute to improved hole-expansion ratio performance and improved fatigue resistance. In turn, this will contribute to improved manufacturing characteristics of the inventive sheets for automotive chassis and suspension applications and will have a positive impact on the in-service performance of these inventive sheets when it comes down to fatigue resistance.

These observations show that the present invention allows an excellent trade-off between strength on the one hand and formability as expressed in terms of both cold stretchability as well as stretch-flangeability on the other. This superior balance between strength and formability is achieved with a substantial or—preferably—a predominantly (granular) bainite microstructure that due to suitable use of Mo and/or Cr additions can be formed at relatively elevated coiling temperatures, e.g., in the range of 550 to 600° C. This range of coiling temperatures still allows sufficient precipitation kinetics in order to obtain substantial precipitation hardening to realise tensile strength levels of at least 780 MPa, or preferably of at least 950 MPa, based on a substantial, or preferably a predominantly (granular) bainitic microstructure.

The Mo and the optional Cr additions are crucial to provide hardenability and to promote a bainitic microstructure that will contain a small, but significant amount of M+RA phase constituents. As such, the microstructures of the inventive sheets of the present invention can be classified—at least partly—as granular bainite. The presence of these second phase islands embedded in between BF phase constituents is beneficial to suppress discontinuous yielding and yield point elongation and hence to promote continuous work hardening behaviour combined with a relatively high yield strength and yield ratio (YR), which is favourable for roll-forming applications. Yet, the amount of M+RA phase constituents may not be too high, since this will be at the expense of hole-expansion capacity and will lead to a loss in yield strength. Instead, the amount of M+RA phase constituents should be balanced in such a way that its fraction is sufficiently high to provide continuous work hardening and relatively high yield strength on the one hand, but does not lead to a substantial loss in yield strength and yield ratio (YR) and a substantial deterioration of the hole-expansion capacity. A volume fraction of up to 5% is required for the present invention. Preferably the amount of M+RA phase constituents is at least 0.8% and/or at most 4%.

EXAMPLE 3

Steels I to L having the chemical compositions shown in Table 1 were hot-rolled to a final thickness of circa 3.6 mm under the conditions given in Table 4, producing sheets 1I to 4L. Prior to tensile testing, the hot-rolled sheets were pickled.

The reported tensile properties of 1I to 4L in Table 4 are based on A50 tensile geometry (gauge length 50 mm) with tensile testing parallel to rolling direction according to EN 10002-1/ISO 6892-1 (2009). The reported hole-expansion ratios ($\lambda$) of sheets 1L to 4L in Table 4 were determined as reported in Example 1.

The microstructures of 1I to 4L were characterised by using Electron BackScatter Diffraction (EBSD) to identify the prevalent character of the microstructure and to determine its phase constituents and fractions. To this purpose identical procedures were followed with respect to sample preparation, EBSD data collection and EBSD data evaluation as those reported for Examples 1 and 2. The fraction of the sum of polygonal ferrite and bainitic ferrite (PF+BF) and the fraction of the sum of martensite and retained-austenite (M+RA) together with the MOD index and 20°-50° MOD intensity of sheets 1I to 4L are reported in Table 4 as well as the volume fractions of BF and PF expressed in volume percent of the overall microstructure as determined based on the MOD index.

All steels in this example are considered to be inventive examples for the present patent application in terms of composition, process, microstructure, tensile properties, and hole-expansion capacity values.

TABLE 1

Composition of steels.

| Steel | Chemical composition (in wt. %) | | | | | | | | | | | | | Atomic ratios | | Ex. |
| | C | Mn | Si | P | S | Al_sol | Nb | V | Ti | Mo | Cr | N | Mo + Cr | A | B | |
|---|---|---|---|---|---|---|---|---|---|---|---|---|---|---|---|---|
| A | 0.099 | 1.823 | 0.210 | 0.001 | 0.003 | 0.013 | 0.079 | 0.299 | 0.003 | 0.493 | 0.002 | 0.0129 | 0.495 | 1.38 | 0.77 | I |
| B | 0.101 | 1.808 | 0.207 | 0.001 | 0.002 | 0.022 | 0.081 | 0.305 | 0.002 | 0.349 | 0.302 | 0.0139 | 0.651 | 1.22 | 0.53 | I |
| C | 0.099 | 1.809 | 0.205 | 0.001 | 0.002 | 0.020 | 0.081 | 0.299 | 0.002 | 0.352 | 0.001 | 0.0138 | 0.353 | 1.23 | 0.54 | I |
| D | 0.100 | 1.842 | 0.216 | 0.001 | 0.002 | 0.019 | 0.054 | 0.305 | 0.002 | 0.353 | 0.002 | 0.0145 | 0.355 | 1.19 | 0.56 | I |
| E | 0.094 | 1.787 | 0.211 | 0.002 | 0.002 | 0.050 | 0.012 | 0.008 | 0.202 | 0.494 | 0.030 | 0.0021 | 0.524 | 1.20 | 1.20 | C |
| F | 0.112 | 1.639 | 0.207 | 0.003 | 0.002 | 0.055 | 0.061 | 0.296 | 0.002 | 0.384 | 0.305 | 0.0062 | 0.689 | 1.12 | 0.62 | I |
| G | 0.114 | 1.629 | 0.209 | 0.002 | 0.003 | 0.067 | 0.060 | 0.298 | 0.011 | 0.410 | 0.002 | 0.0049 | 0.412 | 1.13 | 0.66 | I |
| H | 0.107 | 1.608 | 0.198 | 0.003 | 0.003 | 0.043 | 0.058 | 0.002 | 0.004 | 0.387 | 0.010 | 0.0055 | 0.397 | 0.53 | 6.08 | C |
| I | 0.099 | 1.480 | 0.200 | 0.012 | 0.001 | 0.045 | 0.056 | 0.290 | 0.003 | 0.240 | 0.490 | 0.0050 | 0.730 | 1.07 | 0.40 | I |
| J | 0.100 | 1.770 | 0.190 | 0.013 | 0.001 | 0.019 | 0.055 | 0.290 | 0.000 | 0.250 | 0.004 | 0.0120 | 0.254 | 1.07 | 0.41 | I |
| K | 0.098 | 1.790 | 0.200 | 0.012 | 0.001 | 0.046 | 0.056 | 0.150 | 0.110 | 0.250 | 0.004 | 0.0060 | 0.254 | 0.98 | 0.48 | I |
| L | 0.098 | 1.800 | 0.200 | 0.013 | 0.001 | 0.045 | 0.057 | 0.290 | 0.001 | 0.150 | 0.004 | 0.0045 | 0.154 | 0.96 | 0.25 | I |

Atomic Ratio A: $\dfrac{\left(\dfrac{X}{51}\right)+\left(\dfrac{Ti^*}{48}\right)+\left(\dfrac{Mo}{96}\right)}{\left(\dfrac{C}{12}\right)}$ and Atomic Ratio B: $\dfrac{\left(\dfrac{Mo}{96}\right)}{\left(\dfrac{Nb}{93}\right)+\left(\dfrac{V}{51}\right)+\left(\dfrac{Ti^*}{48}\right)}$ with $Ti^* = Ti - \left(\left(\dfrac{N}{14}\times 48\right)+\left(\dfrac{S}{32}\times 48\right)\right)$ for $Ti \geq 0.01\%$ or $Ti^* = 0$ for $Ti \leq 0.005\%$ and $X = V + \left(\dfrac{Nb}{93}\times 51\right)$ for $Al_{sol} - \left(\dfrac{N}{14}\times 27\right) \geq 0$ or $X = V + \left(\dfrac{Nb}{93}\times 51\right) - \left(\dfrac{N^*}{14}\times 51\right)$ with $N^* = N - \left(\dfrac{Al_{sol}}{27}\times 14\right)$ for $Al_{sol} - \left(\dfrac{N}{14}\times 27\right) < 0$ I = Inventive,
C = Comparative

TABLE 2

Process conditions, properties (tensile data for JIS5 geometry), and microstructure.

| Sheet | Steel | Hot-rolling conditions (average cooling rate after hot rolling = 45° C./s) | | | | Tensile properties (JIS5 tensile geometry) | | | | | | |
|---|---|---|---|---|---|---|---|---|---|---|---|---|
| | | RHT (°C.) | FRT (°C.) | CT (°C.) | t (mm) | Rp0.2 (MPa) | Rm (MPa) | YR — | A (%) | ReH (MPa) | ReL (MPa) | Ae (%) |
| 1 | A | 1240 | 875 | 600 | 1.64 | 766 | 1007 | 0.76 | 14.5 | No | No | No |
| 2 | A | 1240 | 870 | 630 | 2.43 | 867 | 931 | 0.93 | 17.5 | 875 | 862 | 3.0 |
| 3 | B | 1240 | 880 | 600 | 1.67 | 760 | 1028 | 0.74 | 13.7 | No | No | No |
| 4 | B | 1240 | 865 | 630 | 2.35 | 862 | 940 | 0.92 | 16.7 | 875 | 869 | 2.7 |
| 5 | C | 1240 | 865 | 600 | 1.66 | 900 | 1006 | 0.89 | 14.6 | No | No | No |
| 6 | C | 1240 | 885 | 630 | 1.65 | 868 | 929 | 0.93 | 16.4 | 878 | 864 | 5.0 |
| 7 | D | 1240 | 875 | 600 | 1.71 | 895 | 1015 | 0.88 | 15.5 | No | No | No |
| 8 | D | 1240 | 870 | 630 | 2.37 | 898 | 948 | 0.95 | 17.5 | 910 | 888 | 3.4 |
| 9 | E | 1240 | 875 | 600 | 1.65 | 971 | 1076 | 0.90 | 14.1 | No | No | No |
| 10 | E | 1240 | 885 | 630 | 1.65 | 892 | 989 | 0.90 | 13.5 | 908 | 907 | 1.9 |

| Sheet | HEC | | Microstructure | | | | | | |
|---|---|---|---|---|---|---|---|---|---|
| | λ (%) | $λ_N$ — | M + RA (%) | PF + BF (%) | PF (%) | BF (%) | MOD index | 20-50 | Ex. |
| 1 | 74 | 0.78 | 3.6 | 96.4 | 23.5 | 72.9 | 0.87 | 0.287 | I |
| 2 | 95 | 1.00 | 0.1 | 99.9 | 70.4 | 29.5 | 0.34 | 0.543 | C |
| 3 | 67 | 0.71 | 3.9 | 96.1 | 5.0 | 91.1 | 1.09 | 0.171 | I |
| 4 | 82 | 0.86 | 0.5 | 99.5 | 67.5 | 32.0 | 0.37 | 0.531 | C |
| 5 | 76 | 0.80 | 1.3 | 98.7 | 56.6 | 42.1 | 0.49 | 0.468 | I |
| 6 | 79 | 0.83 | 0.1 | 99.9 | 68.6 | 31.3 | 0.36 | 0.532 | C |
| 7 | 74 | 0.78 | 1.6 | 98.4 | 49.6 | 48.8 | 0.57 | 0.423 | I |
| 8 | 74 | 0.78 | 0.3 | 99.7 | 64.2 | 35.5 | 0.41 | 0.506 | C |
| 9 | 47 | 0.49 | 0.3 | 99.7 | 42.5 | 57.2 | 0.66 | 0.391 | C |
| 10 | 61 | 0.64 | 0.1 | 99.9 | 63.4 | 36.5 | 0.42 | 0.502 | C |

TABLE 3

Process conditions, properties (tensile data for A50 geometry), and microstructure.

| Sheet | Steel | Hot-rolling conditions (average cooling rate after hot rolling = 45° C./s) | | | | Tensile properties (A50 tensile geometry) | | | | | | |
|---|---|---|---|---|---|---|---|---|---|---|---|---|
| | | RHT (°C.) | FRT (°C.) | CT (°C.) | t (mm) | Rp0.2 (MPa) | Rm (MPa) | YR — | A (%) | ReH (MPa) | ReL (MPa) | Ae (%) |
| 1 | F | 1240 | 855 | 600 | 3.41 | 956 | 1050 | 0.91 | 12.2 | No | No | No |
| 2 | F | 1240 | 890 | 630 | 3.66 | 878 | 942 | 0.93 | 14.3 | 882 | 875 | 2.1 |
| 3 | G | 1240 | 875 | 600 | 3.61 | 958 | 1044 | 0.92 | 13.7 | No | No | No |
| 4 | G | 1240 | 870 | 630 | 3.69 | 940 | 977 | 0.96 | 14.5 | 952 | 920 | 3.9 |
| 5 | H | 1240 | 900 | 600 | 3.65 | 638 | 749 | 0.85 | 13.9 | No | No | No |
| 6 | H | 1240 | 850 | 630 | 3.74 | 630 | 695 | 0.91 | 18.3 | 642 | 622 | 3.2 |

| Sheet | HEC | Microstructure | | | | | | |
|---|---|---|---|---|---|---|---|---|
| | $λ_N$ (%) | M + RA (%) | PF + BF (%) | PF (%) | BF (%) | MOD index | 20-50 | Ex. |
| 1 | 0.62 | 1.5 | 98.5 | 48.0 | 50.5 | 0.59 | 0.428 | I |
| 2 | 1.00 | 0.1 | 99.9 | 64.3 | 35.6 | 0.41 | 0.511 | C |
| 3 | 0.50 | 0.9 | 99.1 | 50.0 | 49.1 | 0.57 | 0.431 | I |
| 4 | 0.80 | 0.1 | 99.9 | 68.6 | 31.3 | 0.36 | 0.535 | C |
| 5 | 0.55 | 1.4 | 98.6 | 0.9 | 97.7 | 1.14 | 0.160 | C |
| 6 | 0.57 | 0.6 | 99.4 | 44.9 | 54.5 | 0.63 | 0.399 | C |

TABLE 4

Process conditions, properties (tensile data for A50 geometry), and microstructure.

| | | Hot-rolling conditions (average cooling rate after hot rolling = 45° C./s) | | | | Tensile properties (A50 tensile geometry) | | | | | | |
|---|---|---|---|---|---|---|---|---|---|---|---|---|
| Sheet | Steel | RHT (°C.) | FRT (°C.) | CT (°C.) | t (mm) | Rp0.2 (MPa) | Rm (MPa) | YR — | A (%) | ReH (MPa) | ReL (MPa) | Ae (%) |
| 1 | I | 1240 | 860 | 600 | 3.72 | 985 | 1045 | 0.94 | 13.4 | No | No | No |
| 2 | J | 1240 | 870 | 600 | 3.52 | 943 | 1002 | 0.94 | 13.3 | No | No | No |
| 3 | K | 1240 | 880 | 600 | 3.76 | 933 | 996 | 0.94 | 13.0 | No | No | No |
| 4 | L | 1240 | 875 | 600 | 3.75 | 917 | 983 | 0.93 | 16.9 | No | No | No |

| | HEC | | Microstructure | | | | |
|---|---|---|---|---|---|---|---|
| Sheet | $\lambda_N$ (%) | M + RA (%) | PF + BF (%) | PF (%) | BF (%) | MOD index | 20-50 | Ex. |
| 1 | 47 | 1.4 | 98.6 | 53.2 | 45.4 | 0.53 | 0.450 | I |
| 2 | 51 | 0.9 | 99.1 | 46.5 | 52.6 | 0.61 | 0.411 | I |
| 3 | 47 | 2.2 | 97.8 | 22.1 | 75.7 | 0.89 | 0.273 | I |
| 4 | 40 | 1.5 | 98.5 | 5.1 | 93.4 | 1.09 | 0.176 | I |

The invention claimed is:

1. A high-strength hot-rolled steel strip or sheet with a tensile strength of 780 MPa or higher with continuous yielding behaviour, consisting of (in wt %):
   between 0.08 and 0.14% C.;
   between 1.0 and 2.0% Mn;
   between 0.05 and 0.45% Mo;
   between 0.10 and 0.40% V;
   optionally one or more of
      at least 0.1 and/or at most 1.2% Cr;
      at least 0.01 and/or at most 0.14% Ti;
   at least 0.05 and at most 0.5% Si;
   at least 0.01 and at most 0.10% Nb;
   at most 0.04% P;
   at most 0.008% S;
   at most 0.1% Al_sol;
   at most 0.020% N;
   at most 0.003% B;
   optionally Ca in an amount consistent with a calcium treatment for inclusion control;
   balance Fe and inevitable impurities;
wherein the steel strip or sheet has a microstructure that contains a matrix consisting of a mixture of at most 60 vol. % polygonal ferrite (PF) and at least 40 vol. % bainitic ferrite (BF) and between at least 0.8 vol. % and at most 5 vol. % of Σ(martensite and retained-austenite), wherein the PF and BF is precipitation-strengthened with fine composite carbides and/or carbo-nitrides of V and/or of Mo and optionally of Ti and/or of Nb.

2. The steel strip or sheet according to claim 1 having a tensile strength of 950 MPa or higher.

3. The steel strip or sheet according to claim 1, wherein the steel comprises (in wt. %):
   at least 0.15% Mo, and/or
   at least 0.20% Cr, and/or
   at least 0.02% Nb.

4. The steel strip or sheet according to claim 1, wherein the maximum Cr content is 1.0%.

5. The steel strip or sheet according to claim 1, wherein the sum of the intensity of the misorientation angles between 20° and 50° in a normalised MisOrientation angle Distribution (MOD) profile of the microstructure as measured with the Electron BackScatter Diffraction technique is at most 0.50.

6. The steel strip or sheet according to claim 5, wherein the MisOrientation angle Distribution (MOD) index of the microstructure as measured with the Electron BackScatter Diffraction technique is at least 0.45.

7. The steel strip or sheet according to claim 1, wherein Ti is at least 0.01%, and $$0.2 \leq \left( \frac{\left(\frac{Mo}{96}\right)}{\left(\frac{Nb}{93}\right) + \left(\frac{Ti^*}{48}\right) + \left(\frac{V}{51}\right)} \right) \leq 2.0, \text{ and}$$

$$0.7 \leq \left( \frac{\left(\frac{Nb}{93}\right) + \left(\frac{Ti^*}{48}\right) + \left(\frac{V}{51}\right) + \left(\frac{Mo}{96}\right)}{\left(\frac{C}{12}\right)} \right) \leq 2.2,$$

with $Ti^* = Ti_{total} - \left(\left(\frac{N}{14} \times 48\right) + \left(\frac{S}{32} \times 48\right)\right)$.

8. The steel strip or sheet according to claim 1, wherein Ti is at most 0.005%, and $$Al_{sol} - \left(\frac{N}{14} \times 27\right) \geq 0, \text{ and}$$

$$0.2 \leq \left( \frac{\left(\frac{Mo}{96}\right)}{\left(\frac{Nb}{93}\right) + \left(\frac{V}{51}\right)} \right) \leq 2.0, \text{ and}$$

$$1.0 \leq \left( \frac{\left(\frac{Nb}{93}\right) + \left(\frac{V}{51}\right) + \left(\frac{Mo}{96}\right)}{\left(\frac{C}{12}\right)} \right) \leq 2.2.$$

9. The steel strip or sheet according to claim 1, wherein Ti is at most 0.005%, and $$Al_{sol} - \left(\frac{N}{14} \times 27\right) < 0, \text{ and}$$

-continued $$0.2 \leq \left|\frac{\left(\frac{Mo}{96}\right)}{\left(\frac{X}{51}\right)}\right| \leq 2.0, \text{ and}$$

$$1.0 \leq \left|\frac{\left(\frac{X}{51}\right)+\left(\frac{Mo}{96}\right)}{\left(\frac{C}{12}\right)}\right| \leq 2.2,$$

with $X = V + \left(\frac{Nb}{93} \times 51\right) - \left(\frac{N^*}{14} \times 51\right)$ and $N^* = N - \left(\frac{Al_{sol}}{27} \times 14\right)$.

10. The steel strip or sheet according to claim 1 with a yield ratio (YR) of at least 0.7 and a hole-expansion ratio (λ) of 40% or higher, and wherein the tensile strength (TS), total elongation (El), and sheet thickness t (mm) satisfy the equation of (TS×El)/$t^{0.2}$>12000.

11. A coated high-strength steel strip or sheet consisting of:
a zinc-based coating on an upper and/or lower surface of:
a strip or sheet with a tensile strength of 780 MPa or higher with continuous yielding behaviour, consisting of (in wt %):
between 0.08 and 0.14% C;
between 1.0 and 2.0% Mn;
between 0.05 and 0.45% Mo;
between 0.10 and 0.40% V;
optionally one or more of
 at least 0.1 and/or at most 1.2% Cr;
 at least 0.01 and/or at most 0.14% Ti;
at least 0.05 and at most 0.5% Si;
at least 0.01 and at most 0.10% Nb;
at most 0.04% P;
at most 0.008% S;
at most 0.1% Al_sol;
at most 0.020% N;
at most 0.003% B;
optionally Ca in an amount consistent with a calcium treatment for inclusion control;
balance Fe and inevitable impurities;
wherein the steel strip or sheet has a microstructure that contains a matrix consisting of a mixture of at most 60 vol. % polygonal ferrite (PF) and at least 40 vol. % bainitic ferrite (BF) and between at least 0.8 vol. % and at most 5 vol. % of Σ(martensite and retained-austenite), wherein the PF and BF is precipitation-strengthened with fine composite carbides and/or carbo-nitrides of V and/or of Mo and optionally of Ti and/or of Nb.

12. The method of manufacturing the high strength hot-rolled steel strip or sheet according to claim 1 with tensile strength of 780 MPa or higher with continuous yielding behaviour, the method comprising the step of casting a thick or thin slab, consisting of (in wt %):
between 0.08 and 0.14% C;
between 1.0 and 2.0% Mn;
between 0.05 and 0.45% Mo;
between 0.10 and 0.40% V;
optionally one or more of
 at least 0.1 and/or at most 1.2% Cr;
 at least 0.01 and/or at most 0.14% Ti;
at least 0.05 and at most 0.5% Si;
at least 0.01 and at most 0.10% Nb;
at most 0.04% P;
at most 0.008% S;
at most 0.1% Al_sol;
at most 0.020% N;
at most 0.003% B;
optionally Ca in an amount consistent with a calcium treatment for inclusion control;
balance Fe and inevitable impurities;
followed by the step of reheating the solidified slab to a temperature of between 1050 and 1250° C., hot rolling the steel slab and finishing said hot rolling at a finish hot rolling temperature at the Ar3-temperature or higher, cooling the hot-rolled steel strip or sheet to the coiling temperature at an average cooling rate of at least 10° C./s and at most 150° C./s, and coiling the hot rolled steel strip or sheet in the temperature range between 450 and 620° C. to produce a microstructure that consists of a matrix consisting of a mixture of at most 60 vol. % polygonal ferrite (PF) and at least 40 vol. % bainitic ferrite (BF) and between at least 0.8 vol. % and at most 5 vol. % of Σ(martensite and retained-austenite), wherein the PF and BF is precipitation-strengthened with fine composite carbides and/or carbo-nitrides of V and/or of Mo and optionally of Ti and/or of Nb.

13. The method according to claim 12, wherein the coiled hot-rolled steel strip or sheet is subjected to cooling by immersing the coil into a water basin or by actively cooling the coil with a spray of water.

14. The part produced from the high-strength hot-rolled steel strip or sheet according to claim 1, wherein the steel strip has a YR of at least 0.7 and a λ of 40% or higher and wherein tensile strength (TS), total elongation (El), and sheet thickness t (mm) satisfy the equation of (TS×El)/$t^{0.2}$>12000.

15. The steel strip or sheet according to claim 1, wherein the MisOrientation angle Distribution (MOD) index of the microstructure as measured with the Electron BackScatter Diffraction technique is at least 0.45.

16. The steel strip or sheet according to claim 1, with a YR of at least 0.8 and a λ of 40% or higher, and wherein the tensile strength (TS), total elongation (El), and sheet thickness t (mm) satisfy the equation of (TS×El)/$t^{0.2}$>12000.

17. The steel strip or sheet according to claim 1, with a YR of at least 0.7 and a λ of 50% or higher, and wherein the tensile strength (TS), total elongation (El), and sheet thickness t (mm) satisfy the equation of (TS×El)/$t^{0.2}$>12000.

18. The steel strip or sheet according to claim 1, with a YR of at least 0.8 and a λ of 50% or higher, and wherein the tensile strength (TS), total elongation (El), and sheet thickness t (mm) satisfy the equation of (TS×El)/$t^{0.2}$>12000.

19. The steel strip or sheet according to claim 1, with a YR of at least 0.7 and a λ of 60% or higher, and wherein the tensile strength (TS), total elongation (El), and sheet thickness t (mm) satisfy the equation of (TS×El)/$t^{0.2}$>12000.

20. The steel strip or sheet according to claim 1, with a YR of at least 0.8 and a λ of 60% or higher, and wherein the tensile strength (TS), total elongation (El), and sheet thickness t (mm) satisfy the equation of (TS×El)/$t^{0.2}$>12000.

* * * * *